Jan. 4, 1949.  L. DE FOREST  2,457,980
METHOD OF AND APPARATUS FOR BUNCHING ELECTRONS
Filed Sept. 1, 1944  3 Sheets-Sheet 1
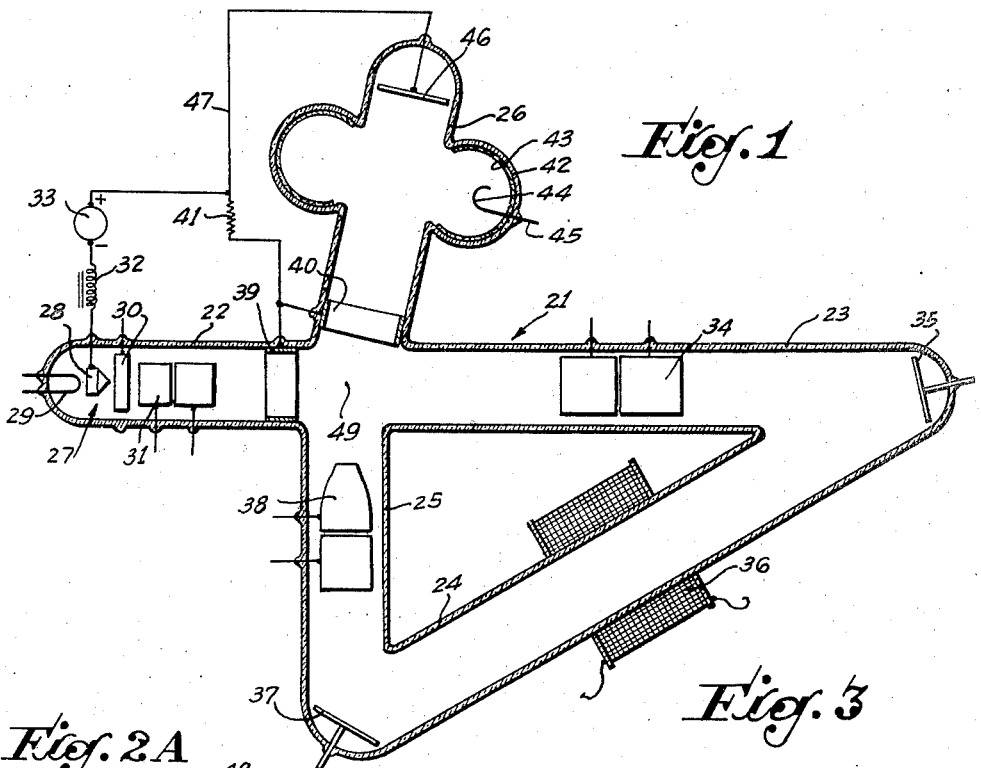
*Fig. 1*
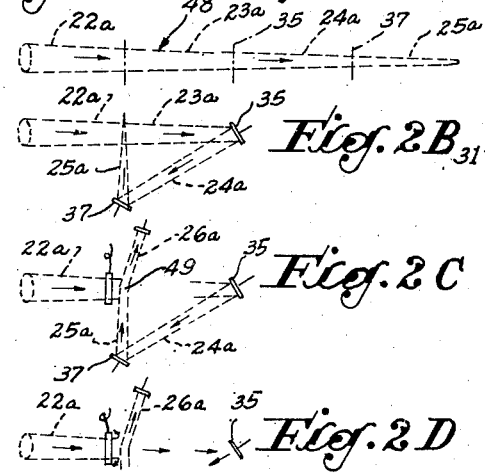
*Fig. 2A*
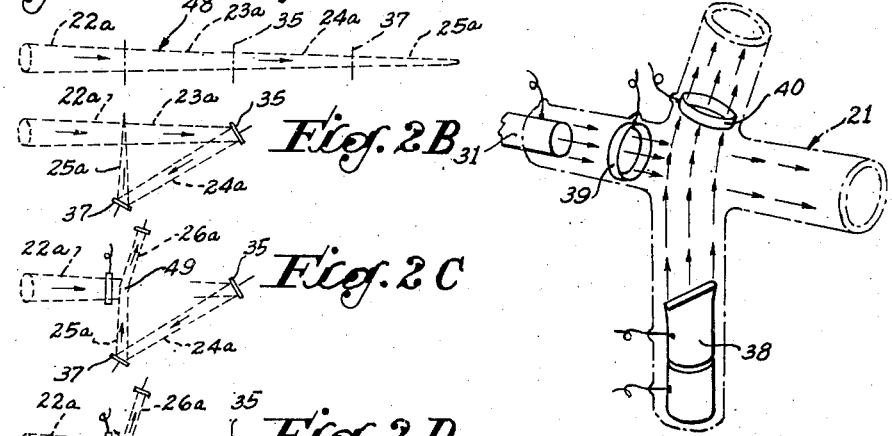
*Fig. 3*
*Fig. 2B*
*Fig. 2C*
*Fig. 2D*
*Fig. 2E*
INVENTOR
LEE DE FOREST
BY
HARRIS, KIECH, FOSTER & HARRIS
Ward D. Foster
FOR THE FIRM
ATTORNEYS Jan. 4, 1949. L. DE FOREST 2,457,980
METHOD OF AND APPARATUS FOR BUNCHING ELECTRONS
Filed Sept. 1, 1944 3 Sheets-Sheet 2
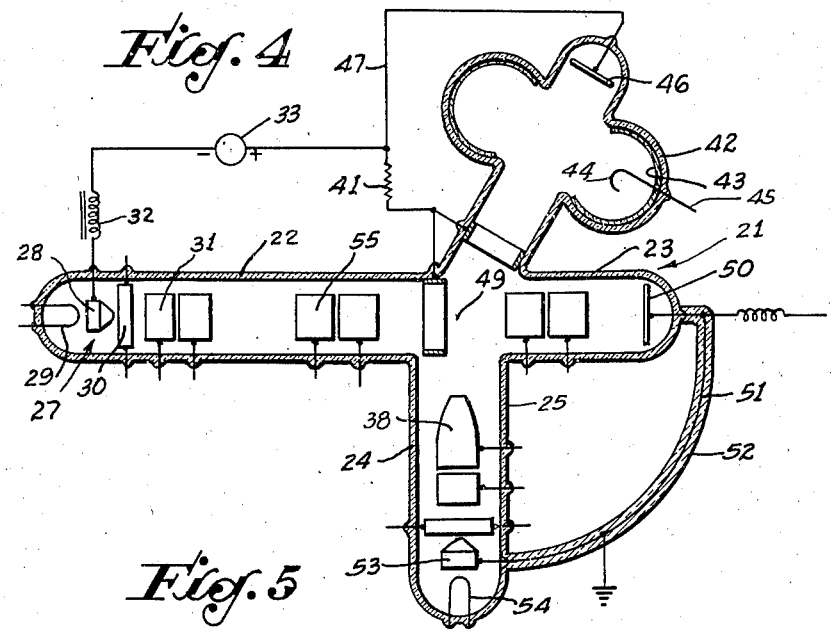
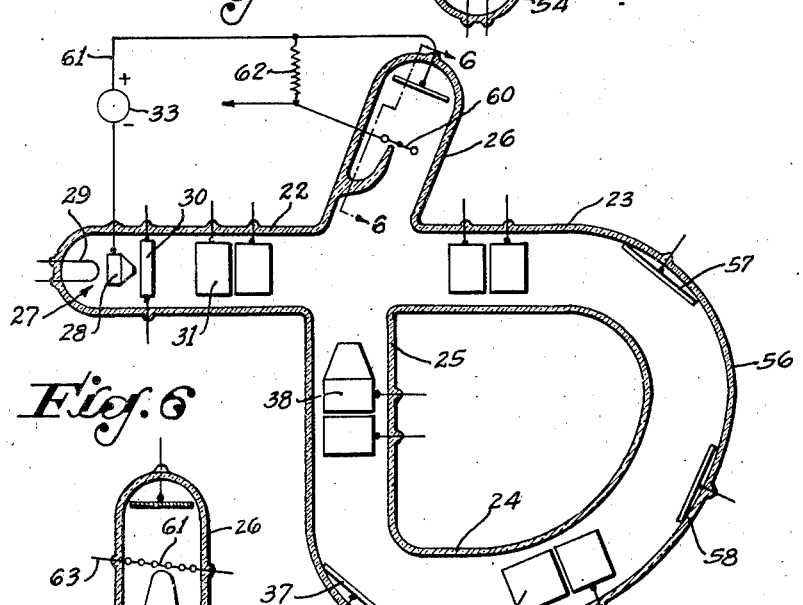
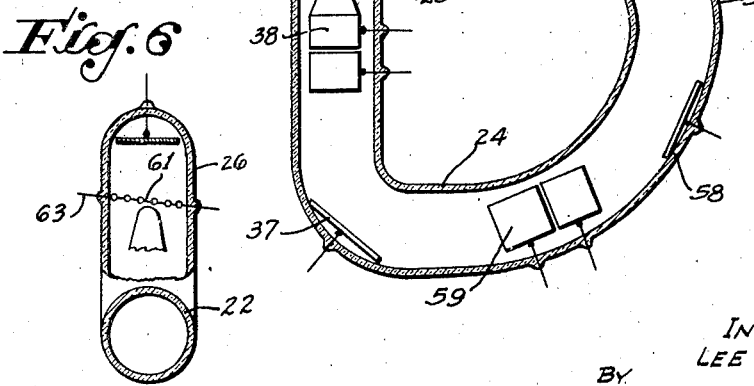
INVENTOR
LEE DE FOREST
BY
HARRIS, KIECH, FOSTER & HARRIS
FOR THE FIRM
ATTORNEYS Jan. 4, 1949. L. DE FOREST 2,457,980
METHOD OF AND APPARATUS FOR BUNCHING ELECTRONS
Filed Sept. 1, 1944 3 Sheets-Sheet 3

INVENTOR
LEE DE FOREST
BY
HARRIS, KIECH, FOSTER & HARRIS
Ward D. Foster
FOR THE FIRM
ATTORNEYS Patented Jan. 4, 1949

2,457,980

UNITED STATES PATENT OFFICE 2,457,980

METHOD OF AND APPARATUS FOR BUNCHING ELECTRONS

Lee de Forest, Los Angeles, Calif.

Application September 1, 1944, Serial No. 552,265

8 Claims. (Cl. 315—21)

My invention relates to a method of and apparatus for modulating, deflecting, and interrupting electron streams in evacuated vessels primarily for the purpose of producing in such manner ultra-high frequency electromagnetic oscillations.

My invention utilizes the principles of so bending, curving, or deflecting an electron beam travelling at high velocity as to direct it into intersection with itself to thereby interrupt and deflect portions of the electron beam.

My invention contemplates utilizing a stream of electrons to influence the travel of electrons in a manner similar to a physical grid structure; thus my invention provides a dynamic screen or grid which behaves in some measure like the static grid or control electrode disclosed in my United States Patent No. 879,532, issued February 18, 1908.

Embodiments of the apparatus of my invention capable of performing my method are described in the following specification, which may be more readily understood by reference to the accompanying drawings, in which Fig. 1 is a vertical elevational view, partially sectioned, of one form of apparatus of my invention;

Figs. 2—A to 2—E, inclusive, are schematic illustrations of the electron beam during successive increments of time after the initiation of my method;

Fig. 3 is a perspective fragmentary view of the apparatus illustrated in Fig. 1;

Fig. 4 is a vertical elevational view, partially sectioned, of a modified form of the apparatus of my invention;

Fig. 5 is a vertical elevational view, partially sectioned, of another form of apparatus of my invention;

Fig. 6 is an enlarged fragmentary view, taken as indicated by the line 6—6 of Fig. 5;

Figure 7:
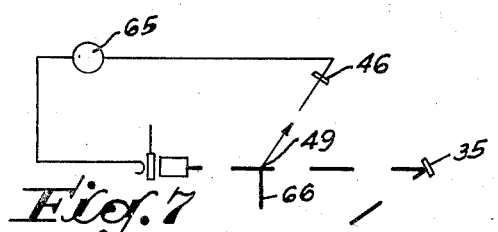
Fig. 7 is a diagrammatic view illustrating the operation of another form of my invention.
Figure 8:
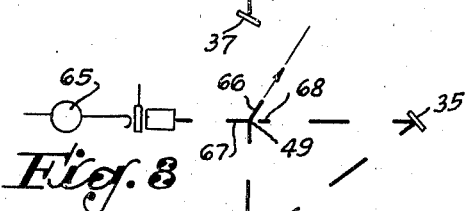
Figure 9:
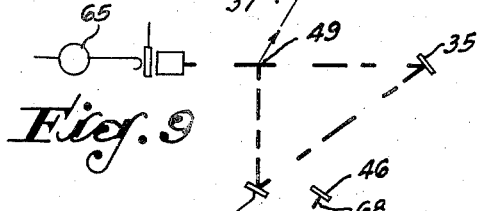
Figure 10:
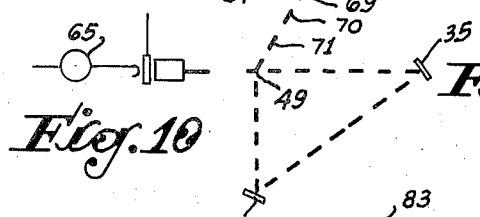
Figure 11:
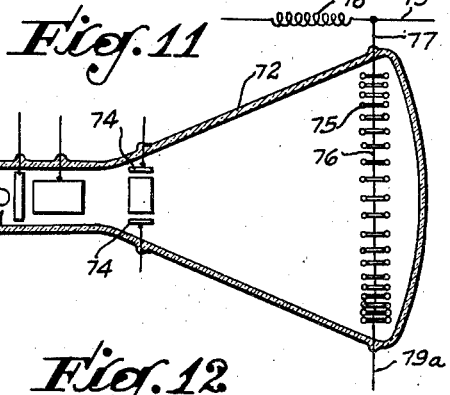
Figure 12:
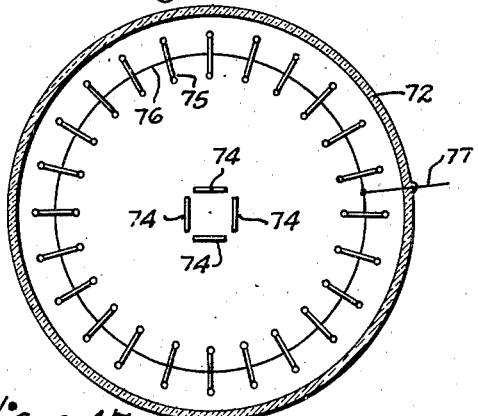
Figure 13:
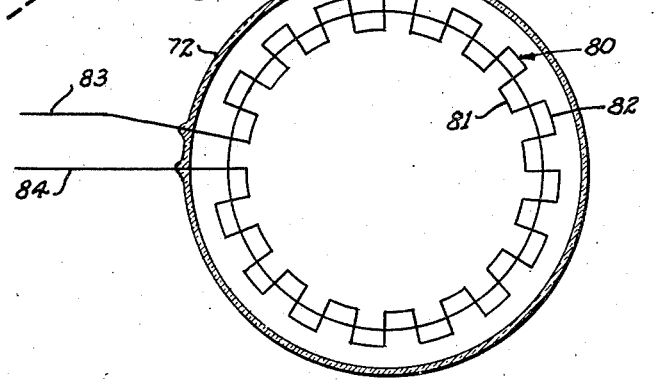

Figs. 8 to 10, inclusive, are diagrammatic views illustrating the electron beam in successive increments of time after the initiation of the method of my invention in accordance with its performance as illustrated in Fig. 7;

Fig. 11 is a vertical elevational view, partially sectioned, of another form of apparatus of my invention for oscillating small resonator bodies;

Fig. 12 is an end elevational view showing another arrangement of resonator bodies for the apparatus illustrated in Fig. 11; and Fig. 13 is an end elevational view of a form of resonator bodies which may be substituted for those illustrated in Figs. 11 and 12.

Referring to the drawings, which are are for illustrative purposes only, the numeral 21 indicates an exhausted housing, preferably of glass, including an electron generating portion 22, a coaxial transmitting portion 23, a return portion 24, an intersecting portion 25, and a receiving portion 26.

As illustrated in Fig. 1, the return portion 24 is so disposed that its axis intersects with an acute angle the axis of the transmitting portion 23 and the intersecting portion 25, the intersecting portion 25 is so disposed that its axis intersects the axis of the generating portion 22 and the transmitting portion 23 substantially at right angles, and the receiving portion 26 is so disposed that its axis overlies and intersects at an acute angle the axis of the transmitting portion 23.

Positioned within the generating portion 22 is an electron or cathode beam gun 27 of conventional construction and including a cathode 28, heater filament 29, grid structure 30, and a first electrostatic electron focusing lens 31. The cathode 28 is connected through an impedance coil 32 to the negative terminal of a source 33 of direct current.

Positioned within the transmitting portion 23 of the housing 21 is a second electrostatic electron focusing lens 34 adapted to focus the electron stream from the cathode 28 into a beam and to direct it against a reflector plate 35 so inclined relative to the axes of the transmitting portion 23 and the return portion 24 as to direct the beam of electrons from the transmitting portion 23 into the return portion 24 parallel to the axis thereof. The reflector plate 35 is connected to a suitable source of voltage to cause a complete reflection of the cathode beam.

Positioned around the return portion 24 is an electromagnetic collimating or focusing lens 36 adapted for focusing the stream of electrons traveling in the return portion 24 into a beam. As will be readily apparent to those skilled in the art, the lenses 31, 34, and 36 may be of either the electrostatic or electromagnetic type well known in the art.

The lens 36 focuses and directs the electron beam travelling through the return portion 24 into contact with a second reflector plate 37 connected to a suitable source of voltage and reflecting the electron beam into the intersecting portion 25 and parallel to the axis thereof. Positioned in the return portion 25 and coaxially therewith is a flattening lens 38 which, as best illustrated in Fig. 3, directs the electron stream travelling in the intersecting portion 25 into a flattened beam having its major dimension in a horizontal plane substantially at right angles to the axis of the generating portion 22 and the transmitting portion 23 of the housing 21. Collector rings 39 and 40, respectively, are positioned within the generating portion 22 and the receiving portion 26 of the housing 21 adjacent their intersection with each other, and these collector rings 39 and 40 are connected through a resistance 41 with the positive terminal of the direct current source 33.

Formed in the receiving portion 26 of the housing 21 is a resonance chamber or cavity 42 toroidal in form, the inner surface of which is provided with a coating 43 of conductive material, such as graphite or a suitable metal. A hook electrode 44 is positioned within the resonance chamber 42 and connected to a conductor 45.

Positioned within the receiving portion 26 beyond the resonance chamber 42 is a collector plate 46 which is connected by a conductor 47 to the positive terminal of the direct current source 33.

The lenses 31, 34, and 36 are connected to sources of sufficiently high direct current voltage to give the beam of electrons travelling upwardly in the intersecting portion 26 of the housing 21 a much higher velocity than the beam of electrons travelling horizontally in the generating portion 22, and the voltage applied to the flattening lens 38 is of such value that the velocity of the electron beam directed thereby is so related to the velocity of the beam of electrons focused and directed by the first focusing lens 31 at their intersection that the beam which is the resultant of their intersection travels axially of the receiving portion 26 of the housing 21 and finally strikes the collector plate 46.

In Fig. 2 there is illustrated diagrammatically the electron beam as generated by the gun 27 if this beam travelled in a straight line, such beam being indicated by the numeral 48 and including portions 22a to 25a, inclusive, corresponding to portions 22 to 25, inclusive, of the housing 21.

It will be observed from Fig. 2—A that the beam 48 diminishes in cross-sectional area as it progresses under the influence of the focusing lenses 31, 34, and 36. As illustrated in Fig. 2—B, the reflector plate 35 directs the beam 48 against the second reflector plate 37, which in turn directs the beam into intersection with the portion 22a of the beam at the intersection 49 of the axis of the generating portion 22 and the axis of the intersecting portion 25 of the housing 21.

As is illustrated in Fig. 2—C, such intersection provides a resultant portion 26a travelling parallel to the axis of and in the receiving portion 26 of the housing 21. The intersecting beams cause some dispersion of electrons, particularly from the horizontally travelling beam portion 22a, and these dispersed electrons are collected upon the rings 39 and 40. The resultant beam 26a travels through the receiving portion 26 and impinges upon the collector plate 46.

During the existence of the resultant beam portion 26a, the travel of the beam portion 22a beyond the intersection 49 is interrupted, the absence of the beam portion 23a being illustrated in Fig. 2—C and the absence of the beam portions 23a, 24a, and 25a being illustrated in Fig. 2—D. Such interruption continues until the electrons travelling at the end of the beam in the portion 23 of the housing 21 when the interruption was initiated travel through the portions 23, 24, and 25 of the housing 21 and beyond the intersection 49, whereupon, as illustrated in Fig. 2—E, the electron stream from the generating portion 22 again resumes its horizontal travel into the transmitting portion 23 of the housing 21.

As will be readily apparent, this interruption and resumption of the travel of the electron beam from the generating portion 22 horizontally beyond the intersection 49 occurs alternately and is repetitive and will result in a succession of isolated or bunched electrons travelling into the receiving portion 26 of the housing 21. This interruption and resumption possesses a definite periodicity, the duration of the interruption depending upon the voltages applied to the various accelerating lenses or electrodes traversed by the electron stream, and the distances travelled by the electron streams in the portions 23, 24, and 25 of the housing 21. The resonance chamber 42 is so dimensioned and disposed that the travel of these electron bunches through the receiving portion 26 and their impingement upon the collector plate 46 sets up sustained electromagnetic oscillations within the resonance chamber 42 which are picked up by the hook electrode 44 and led outside of the housing 21 by the conductor 45.

Inasmuch as the speed of the electron stream is, at its greatest, considerably less than the velocity of light, it is frequently highly desirable to condense, as far as practicable, the longitudinal or axial dimensions of the housing or tube in order to obtain the highest possible frequencies of beam cut-off. Apparatus in which this longitudinal or axial dimension is reduced is illustrated in Fig. 4 in which those parts corresponding to the parts illustrated in Fig. 1 are indicated by similar numbers.

In the apparatus of Fig. 4 the transmitting portion 23 of the housing 21 is made as short as possible, and there is substituted for the reflector plate 35 a first auxiliary collector plate 50. The return portion 24 of the housing 21 is omitted, and the ends of the portions 23 and 25 are closed. The auxiliary collector plate 50 is connected by a conductor 51 in a cable 52 to a second cathode 53 in the lower end of the intersecting portion 25 of the housing 21.

The numeral 54 indicates a heater filament for the second cathode 53. There is required a well insulated source of filament current for heating the second cathode 53 which, although it may be connected to a source of high positive voltage, must nevertheless be negative as regards the final high positive voltage collector plate 46.

The numeral 55 indicates an additional electrostatic focusing lens positioned in the generating portion 22 of the housing 21 for purpose of further focusing and accelerating the electron beam therein.

The apparatus of Fig. 4, by substituting a short conductor for a necessarily longer evacuated tube, greatly diminishes the time required for the electron stream, after leaving the intersection 49, to return to such intersection and thereby correspondingly increases the frequency of interruption of the electron stream and the bunching of the electrons and correspondingly increases the frequency of the electromagnetic waves generated in and transmitted from the resonance chamber 42.

In Fig. 5 is illustrated another form of apparatus in which the distance travelled by the electron stream from the intersection 49 to its return to such intersection is shortened, the elements corresponding to those illustrated and described in connection with Fig. 1 being indicated by the same numbers.

In this embodiment the transmitting portion 23 and return portion 24 of the housing 21 are not angularly connected as in Fig. 1 but are connected by a curved portion 56 of the housing 21, a plurality of auxiliary reflector plates, illustrated as two in number and indicated by the numerals 57 and 58, respectively, being so positioned within the curved portion 56 as to reflect the electron beam from the transmitting portion 23 into the return portion 24 of the housing 21, so that it impinges upon and is reflected by the reflector plate 37.

In this form of apparatus there is substituted for the electromagnetic focusing lens 36 an electrostatic focusing lens 59 similar to the focusing lenses 31 and 34 previously described.

Also in the apparatus of Fig. 5 there is substituted for the resonance chamber 42 a plurality of metallic resonator bodies 60 extending transversely across the receiving portion 26 of the housing 21. These resonator bodies 60 may be in the form of small spheres linked together by a suitable conductor or, as illustrated in Fig. 5, in the form of dipole or dumb-bell-shaped bodies connected together at their middles by a conductor 61, shown in Fig. 6. As there illustrated the dipole bodies are arranged in parallel relationship along the conductor 61, such conductor extending parallel to the major dimension of the beam resulting from the passage of the electron stream through the flattening lens 38 as such beam is deflected by intersection with the beam from the generating portion 22 of the housing 21. The conductor 61 is connected through a suitable resistance 62 to the positive terminal of the direct current high voltage source 33.

As illustrated in Fig. 6, the chain of resonator bodies 60 extend across the receiving portion 26 of the housing 21 at a slight angle, indicated as 63, with the plane normal to the axis of the receiving portion 26 and the electron beam travelling therein.

The flat advancing front of each bunch of electrons travelling in the receiving portion 26 strikes first the lowermost resonator body on the conductor 61, setting this body into shock vibration. Thereafter, this flat front of such electron bunch strikes the adjacent resonator body 60, throwing it into oscillation in a similar manner. Successive resonator bodies are successively impacted by the front of the travelling electron bunch.

Obviously the rate at which successive resonator bodies are impacted by the advancing front of an electron bunch increases as the angle 63 between the axes of the resonator bodies and the front of the advancing electron bunch (or plane normal to the axis of the receiving portion 26) is diminished. If the velocity of the advancing electron bunch is $V_e$, the velocity of the variation of impacts of the front of the electron stream or bunch along the line of resonator bodies will be $V_e$ divided by the sine of the angle between the plane of the front of the electron stream or bunch and the axis of the chain of resonator bodies 60; for example, if the velocity of the electron stream or bunch be 3,000 miles per second, i. e., $1/62$ the velocity of light, and the angle 63 is 5°, the sine of which angle is .087, then the velocity of the impacts along the axis of the chain of resonator bodies 60 will be equal to the velocity of light divided by 11.5.

If the successive resonator bodies 60 are to be impacted by each electron bunch at such time intervals that the successive oscillations fall in step with each other and are thus integrated into the harmonious generation of electromagnetic waves, the resonator bodies should be so proportioned that the wave length which each generates should be 11.5 times greater than the distance between the centers of two adjacent resonator bodies. This can best be accomplished by designing the resonator bodies 60 in the form of half wave dipoles, such as illustrated in Fig. 5, the length of each resonator body 60 being 5.75 times greater than the distance separating the axes of two adjacent resonator bodies.

To insure that the electron stream shall impinge upon only one end of each of the resonator bodies 60, a partition 64 of insulating material is positioned within the receiving portion 26 of the housing 21 in a manner to seal one end of each of such bodies, as illustrated in Fig. 5.

It is contemplated in the foregoing description of the operations of the apparatus of my invention that the source of high voltage is one of direct current. If, however, instead of a direct current source, there is employed a source of alternating current, or preferably one of rectified alternating current, the positive portions of which only are applied to the collector plate 46, different conditions will obtain.

For such operations the square wave, as distinguished from the usual sinusoidal wave, is preferred. The behavior of the electron stream under these conditions is diagrammatically illustrated in Figs. 7 to 10, inclusive, in which the numeral 65 represents the source of square wave alternating current, rectified or self-rectified in such a manner that only the positive half of the square wave cycle is applied to the collector plate 46.

Instead of employing an alternating current of square wave, a source of direct current high voltage may be employed and a square wave from another source of ultra-high frequency applied to the grid structure 30 of the cathode beam gun 27 illustrated in Fig. 1.

It is preferable that the frequency of the alternating current be high, as, for example, of the order of 1,000 megacycles per second.

Such current sources will result in a series of short length electron bunches separated by corresponding spaces, as illustrated in Fig. 7.

These electron groups or "dashes" are severed by means of the higher velocity electron groups or dashes which are flattened in cross section, as previously described. Thus, as illustrated in Fig. 8, one of such groups indicated by the numeral 66 is caused to intersect another of such groups 67 at a point slightly behind the front extremity of the group 67, thus permitting a short portion of the horizontally travelling group 67 to continue its horizontal travel, such smaller group or "dot" being indicated by the numeral 68, such small group or dot 68 being followed in its horizontal travel by a larger group or small dash.

When the small groups or dots so divided reach the intersection 49, each serves to cut a horizontally travelling larger group or dash into two dots, one cut off by the vertically travelling dot, and the other cut off by the following vertical dash. The vertically travelling dot, after its intersection with the horizontally travelling electrons, is deflected into the receiving portion 26 of the housing 21. As this process continues, each horizontally travelling large group or dash of electrons is interrupted by a series of vertically travelling small groups or dots, resulting eventually in the complete transformation of the horizontally travelling large groups or dashes into a series of small groups or dots equally spaced from each other. Such division, of course, results in a series of equally spaced small groups of electrons travelling in the receiving portion 26 of the housing 21, as indicated by the numerals 68 to 71, inclusive, in Fig. 10.

These small groups 68 to 71, inclusive, represent a multiplication of the frequency of the original larger groups 67 by many times, the exact degree of multiplication depending upon the acceleration given to the electron groups by the lenses 34, 36, and 38 and the length of their travel from the intersection 49 back to such intersection. Thus it is possible to obtain very large frequencies of electron bunches which may be employed for the excitation for a train of electromagnetic waves in the appropriately dimensioned resonance chamber 42 of the apparatus of Fig. 1 or in the resonator bodies 60 of Figs. 5 and 6.

Illustrated in Fig. 11 is a different form of apparatus adapted for setting into oscillation a series of small resonator bodies, such as dipole bodies or sections of a serrated conductor. In the apparatus of this figure the numeral 72 indicates a cathode beam tube of conventional shape in which there is positioned an electron gun 73 of known design. Four deflecting electrodes 74 are positioned within the tube 72 and connected in the usual manner to a two-phase source of high frequency voltage, for example, of the order of 1,000 megacycles or $10^9$ C. P. S. A voltage of such frequency applied to the deflecting electrodes 74 causes the cathode beam to sweep over the surface of a cone, so that the end of the beam will describe a circular pattern.

Near the enlarged end of the cathode beam tube 72 is a circular arrangement of a number of small dipole resonator bodies 75 connected at their midpoints by a wire 76 of circular form, which in turn is connected to a conductor 77. The conductor 77 is connected through a high frequency choke coil 78 to an appropriate source of positive voltage and to a conductor 79 for leading off the ultra-high frequency oscillations set up by the dipoles.

Of course the conductor 79 may be connected to the wire 76 independently of the conductor 77, as indicated by the broken line 79a, if desired. As illustrated in Fig. 11, the axes of the resonator bodies 75 are illustrated as parallel to the longitudinal axis of the cathode beam tube 72, so that the electrons of the cathode beam impinge directly upon the heads of the resonator bodies 75.

In Fig. 12 in which the elements corresponding to those illustrated in Fig. 11 and previously described are indicated by the same numbers, the resonator bodies 75 are shown arranged with their axes in a plane normal to the longitudinal axis of the cathode beam tube 72, the extent of deflection of the cathode beam being so controlled by the deflector electrodes that the beam sweeps over only one end, preferably the inner end, of each of the resonator bodies 75.

In the apparatus of both Figs. 11 and 12 the resonator bodies 75 are caused to oscillate by impingement thereon of the cathode beam in the same manner and with the same result as hereinbefore set forth.

The following specific arrangement, conditions, and dimensions are set forth by way of example and not by way of limitation, it being readily apparent to those skilled in the art that many other arrangements, conditions, and dimensions could be employed to secure the same effect.

If the diameter of the inner circle of enlarged ends or heads of the resonator bodies 75 in the arrangement illustrated in Fig. 12 be made 25 centimeters, the circumference of such a circle will be approximately 80 centimeters, and, if the cathode beam be revolved at the rate of one revolution in $10^{-9}$ seconds, the interval between successive impacts of the electron stream upon the enlarged ends or heads of adjacent resonator bodies 75 will be $\frac{1}{8}$ times $10^{-10}$ seconds, or approximately $10^{-11}$ seconds.

If the length of each resonator body 75 be 5 millimeters (providing a wave length by its oscillation of approximately 1 centimeter in length), the period of its oscillation will be $\frac{1}{3}$ times $10^{-10}$ seconds. If each resonator body 75, after the brief impact of the electron beam, oscillates five times before the amplitude of its vibration diminishes to approximately half its initial value, the duration thereof is $\frac{5}{3}$ times $10^{-10}$ seconds.

The cathode beam tube in that time will have travelled over and impacted thirteen resonator bodies 75, so that thirteen of such resonator bodies will be oscillated simultaneously at amplitudes between maximum amplitude and half such maximum amplitude, and all of such oscillations will be in synchronism, provided the diameter of the circle of the enlarged ends or heads of the resonator bodies 75 has been selected so that it is properly correlated to the speed of rotation of the cathode beam and the dimensions of the resonator bodies 75.

If, however, the frequency of the cathode beam sweep is reduced to 300 megacycles per second, approximately four resonator bodies 75 will be oscillated simultaneously within the amplitude limits above set forth.

In either event there is a continual oscillation emanating from the array of resonator bodies, the quantum of energy of this radiation being determined by the voltage of the cathode ray beam and the quantity of current conveyed thereby to the resonator bodies 75. Such electromagnetic energy may be radiated directly through the glass walls of the cathode beam tube 72, or it may be conducted away to an appropriate radiator or wave guide by means of the conductor 79.

Illustrated in Fig. 13 is another arrangement of resonator bodies formed of a serrated conductor 80 having inner and outer alternating sections 81 and 82, respectively. The serrated conductor 80 is arranged so that only the inner or outer, and preferably the inner, sections 81 are impacted by the cathode beam during its sweep. The two terminals of the serrated conductor 80 are connected to conductors 83 and 84 extending out of the cathode beam tube 72. These two conductors 83 and 84 may form a Lecher system for conducting the summation of high frequency electromagnetic impulses generated by each section of the serrated conductor 80. With this arrangement, as with those previously described, the period of the circular sweep of the cathode beam has a definite relationship with the natural period of vibration of the individual sections or resonator bodies and the spatial extent of the separation of adjacent sections or resonator bodies, so that all of the sections or bodies will oscillate in synchronism.

In each form of the apparatus hereinbefore described all of the energy radiated from individual resonator bodies will be in phase, and, although only a small fraction of the resonator bodies will be oscillating in any one instant, the performance will be continuous so that an undamped wave train of exceedingly high frequency is thus obtained.

By proper dimensioning of the resonator bodies, by providing the resonator bodies in the proper number, and by providing the voltage intensity and frequency of circular sweep of the cathode beam of the proper values, undamped wave trains comprising waves of lengths of the order of a few millimeters are thus generated.

In accordance with the method of my invention, there is generated a beam or stream of electrons which may, if desired, be focused and accelerated by suitable means, such as electrostatic lens means or electromagnetic lens means. This electron beam is deflected so that, during its continuous generation and travel, it is caused to intersect itself to provide a resultant stream comprising discrete groups or bunches of electrons travelling at the same or, and preferably, greater velocity than the electron stream emanating from its source. Finally this stream of discrete groups or bunches of electrons is utilized to provide an undamped wave train of wave lengths up to a few millimeters and of extremely high frequency.

Such a train of electromagnetic waves may be provided by impinging such groups or bunches upon resonator elements, the natural period of vibration of which is properly related to the space between adjacent resonator elements and the period of the sweep, or by impinging such discrete groups or bunches of electrons upon a collector plate in a tube containing a resonance chamber of proper dimensions from which the electromagnetic waves may be led by a suitable conductor.

While those embodiments of the apparatus of my invention hereinbefore illustrated and described are fully capable of performing the objects primarily stated and the operations herein described, it will be readily apparent to those skilled in the art that various modifications may be made in such apparatus without departing from my invention and that the apparatus described and such modifications may be utilized for the performance of various modifications of the method of my invention. My invention is to be understood, therefore, as not restricted to the specific embodiments or methods hereinbefore described but as including all variations thereof coming within the scope of the claims which follow.

I claim as my invention:

1. In a device of the character described, the combination of: a substantially circular conductor; a plurality of oscillators mounted on and spaced along said conductor; means for producing a cathode beam; and means for causing said beam to impinge upon said oscillators in sequence.

2. In an apparatus of the character described, the combination of: a plurality of electromagnetic oscillators spaced apart along a predetermined path; means for producing a cathode beam; and means for causing said beam to move along said path so that it impinges upon said oscillators in sequence, the spacing of said oscillators and the rate of movement of said beam along said path being so related that at least two of said oscillators are always oscillating.

3. An apparatus as set forth in claim 2 wherein the spacing of said oscillators and the velocity of the beam along said path are so related that at least two of said oscillators are always oscillating at at least one-half maximum amplitude.

4. An apparatus according to claim 2 wherein said oscillators are dipole bodies each having an end on said path.

5. An apparatus as set forth in claim 2 wherein said path is substantially circular.

6. An apparatus as set forth in claim 2 wherein said oscillators are formed by a serrated conductor.

7. In an apparatus of the character described, the combination of: a substantially circular conductor; a plurality of dipole oscillators spaced along said conductor and connected thereto at their midpoints; means for producing a cathode beam; and means for causing said beam to impinge upon adjacent ends of said dipole oscillators in sequence.

8. An apparatus as set forth in claim 7 wherein the frequency of impingement of said beam on said oscillators is such that at least one of said oscillators is oscillating at at least one-half maximum amplitude at all times.

LEE DE FOREST.

REFERENCES CITED

The following references are of record in the file of this patent:

UNITED STATES PATENTS

| Number | Name | Date |
|---|---|---|
| 2,059,863 | Hansell | Nov. 3, 1936 |
| 2,060,770 | Hansell | Nov. 10, 1936 |
| 2,084,476 | Brown | June 22, 1937 |
| 2,087,252 | Gunn | July 20, 1937 |
| 2,124,973 | Fearing | July 26, 1938 |
| 2,153,190 | Hollmann | Apr. 4, 1939 |
| 2,185,693 | Mertz | Jan. 2, 1940 |
| 2,197,338 | Fritz | Apr. 16, 1940 |
| 2,265,848 | Lewis | Dec. 9, 1941 |
| 2,289,319 | Strobel | July 7, 1942 |
| 2,302,118 | Gray | Nov. 17, 1942 |
| 2,368,329 | Rosencrans | Jan. 30, 1945 |

FOREIGN PATENTS

| Number | Country | Date |
|---|---|---|
| 468,185 | Great Britain | Nov. 13, 1936 |
| 508,845 | Great Britain | Nov. 16, 1938 |